(12) United States Patent
Xu et al.

(10) Patent No.: US 8,984,884 B2
(45) Date of Patent: Mar. 24, 2015

(54) WASTE HEAT RECOVERY SYSTEMS

(75) Inventors: James Jun Xu, Niskayuna, NY (US);
Albert Andreas Scharl, Innsbruck (AT);
Shamim Imani, Fullerton, CA (US)

(73) Assignee: General Electric Company, Schenectady, NY (US)

(*) Notice: Subject to any disclaimer, the term of this patent is extended or adjusted under 35 U.S.C. 154(b) by 404 days.

(21) Appl. No.: 13/343,466

(22) Filed: Jan. 4, 2012

(65) Prior Publication Data
US 2013/0168972 A1 Jul. 4, 2013

(51) Int. Cl.
*F01K 25/08* (2006.01)
*F01K 23/04* (2006.01)

(52) U.S. Cl.
USPC .................. 60/665; 60/651; 60/671

(58) Field of Classification Search
USPC .............. 60/655, 651, 671; 290/1 R
See application file for complete search history.

(56) References Cited

U.S. PATENT DOCUMENTS

| | | |
|---|---|---|
| 2,276,695 A | 3/1942 | Lavarello |
| 2,409,857 A | 10/1946 | Hines et al. |
| 2,465,761 A | 3/1949 | Staude |
| 2,917,636 A | 12/1959 | Akeley |
| 3,035,557 A | 5/1962 | Litwinoff et al. |
| 3,060,335 A | 10/1962 | Greenwald |
| 3,064,942 A | 11/1962 | Martin |
| 3,212,477 A | 10/1965 | Gerber et al. |
| 3,232,050 A | 2/1966 | Robinson et al. |
| 3,349,548 A | 10/1967 | Boyen |
| 3,376,857 A | 4/1968 | Smith |
| 3,393,515 A | 7/1968 | Tabor et al. |
| 3,439,201 A | 4/1969 | Levy et al. |
| 3,530,836 A | 9/1970 | Caravatti |
| 3,599,424 A | 8/1971 | Yampolsky |
| 3,728,857 A | 4/1973 | Nichols |
| 3,830,062 A | 8/1974 | Morgan et al. |
| 3,937,855 A | 2/1976 | Gruenwald |
| 3,943,443 A | 3/1976 | Kimura et al. |
| 3,950,950 A | 4/1976 | Doerner et al. |
| 3,999,787 A | 12/1976 | Park |
| 4,033,141 A | 7/1977 | Gustafsson |
| 4,041,709 A * | 8/1977 | Rajakovics ............... 60/655 |
| 4,170,435 A | 10/1979 | Swearingen |
| 4,185,465 A | 1/1980 | Shaw |
| 4,260,914 A | 4/1981 | Hertrich |

(Continued)

FOREIGN PATENT DOCUMENTS

| | | |
|---|---|---|
| DE | 102008019813 | 10/2009 |
| EP | 0462724 A1 | 12/1991 |

(Continued)

OTHER PUBLICATIONS

Keith Gawlik et al., Advanced Binary Cycles: Optimum Working Fluids, Jun. 2010, p. 1809-1814.

(Continued)

*Primary Examiner* — Hoang Nguyen
(74) *Attorney, Agent, or Firm* — Fletcher Yoder, P.C.

(57) ABSTRACT

In one embodiment, a waste heat recovery system includes multiple organic Rankine cycle (ORC) systems arranged in a cascade configuration. Each ORC system includes a heat exchanger that transfers heat to the working fluid to vaporize the working fluid. Each ORC system also includes an integrated power module that expands the working fluid to generate electricity.

20 Claims, 4 Drawing Sheets

(56) References Cited

U.S. PATENT DOCUMENTS

| | | | |
|---|---|---|---|
| 4,262,495 A | 4/1981 | Gupta et al. | |
| 4,262,636 A | 4/1981 | Augsburger | |
| 4,301,375 A | 11/1981 | Anderson | |
| 4,309,870 A | 1/1982 | Guest et al. | |
| 4,341,151 A | 7/1982 | Sakamoto | |
| 4,358,697 A | 11/1982 | Liu et al. | |
| 4,362,020 A | 12/1982 | Meacher et al. | |
| 4,363,216 A | 12/1982 | Bronicki | |
| 4,415,024 A | 11/1983 | Baker | |
| 4,424,665 A | 1/1984 | Guest et al. | |
| 4,463,567 A | 8/1984 | Amend et al. | |
| 4,472,355 A | 9/1984 | Hickam et al. | |
| 4,479,354 A | 10/1984 | Cosby | |
| 4,512,851 A | 4/1985 | Swearingen | |
| 4,544,855 A | 10/1985 | Prenner et al. | |
| 4,553,397 A | 11/1985 | Wilensky | |
| 4,555,637 A | 11/1985 | Irvine | |
| 4,558,228 A | 12/1985 | Larjola | |
| 4,635,412 A | 1/1987 | Le Poittevin | |
| 4,635,712 A | 1/1987 | Baker et al. | |
| 4,659,969 A | 4/1987 | Stupak, Jr. | |
| 4,738,111 A | 4/1988 | Edwards | |
| 4,740,711 A | 4/1988 | Sato et al. | |
| 4,748,814 A | 6/1988 | Tanji et al. | |
| 4,760,705 A | 8/1988 | Yogev et al. | |
| 4,806,662 A | 2/1989 | Bargigia et al. | |
| 4,838,027 A | 6/1989 | Rosado et al. | |
| 4,888,947 A | 12/1989 | Thompson | |
| 4,891,934 A | 1/1990 | Huelster | |
| 4,996,845 A | 3/1991 | Kim | |
| 5,000,003 A | 3/1991 | Wicks | |
| 5,003,211 A | 3/1991 | Groom | |
| 5,021,697 A | 6/1991 | Kralick | |
| 5,083,040 A | 1/1992 | Whitford et al. | |
| D325,080 S | 3/1992 | Wortham | |
| 5,107,682 A | 4/1992 | Cosby | |
| 5,196,746 A | 3/1993 | McCabria | |
| 5,241,425 A | 8/1993 | Sakamoto et al. | |
| 5,263,816 A | 11/1993 | Weimer et al. | |
| 5,285,123 A | 2/1994 | Kataoka et al. | |
| 5,315,197 A | 5/1994 | Meeks et al. | |
| 5,351,487 A | 10/1994 | Abdelmalek | |
| 5,481,145 A | 1/1996 | Canders et al. | |
| 5,514,924 A | 5/1996 | McMullen et al. | |
| 5,531,073 A | 7/1996 | Bronicki et al. | |
| 5,559,379 A | 9/1996 | Voss | |
| 5,611,411 A | 3/1997 | Reilly, III | |
| 5,627,420 A | 5/1997 | Rinker et al. | |
| 5,640,064 A | 6/1997 | Boyd, Jr. et al. | |
| 5,668,429 A | 9/1997 | Boyd, Jr. et al. | |
| 5,671,601 A | 9/1997 | Bronicki et al. | |
| 5,672,047 A | 9/1997 | Birkholz | |
| 5,743,094 A | 4/1998 | Zimron et al. | |
| 5,780,932 A | 7/1998 | Laffont | |
| 5,818,242 A | 10/1998 | Grzybowski et al. | |
| 5,852,338 A | 12/1998 | Boyd, Jr. et al. | |
| 5,894,182 A | 4/1999 | Saban et al. | |
| 5,911,453 A | 6/1999 | Boyd, Jr. et al. | |
| 5,942,829 A | 8/1999 | Huynh | |
| 5,970,714 A * | 10/1999 | Bronicki et al. | 60/641.3 |
| 5,990,588 A | 11/1999 | Kliman et al. | |
| 5,994,804 A | 11/1999 | Grennan et al. | |
| 6,002,191 A | 12/1999 | Saban | |
| 6,018,207 A | 1/2000 | Saban et al. | |
| 6,041,604 A | 3/2000 | Nicodemus | |
| 6,087,744 A | 7/2000 | Glauning | |
| 6,088,905 A | 7/2000 | Boyd, Jr. et al. | |
| 6,130,494 A | 10/2000 | Schob | |
| 6,140,733 A * | 10/2000 | Wedde et al. | 310/196 |
| 6,148,967 A | 11/2000 | Huynh | |
| 6,167,703 B1 | 1/2001 | Rumez et al. | |
| 6,177,735 B1 | 1/2001 | Chapman et al. | |
| 6,191,511 B1 | 2/2001 | Zysset | |
| 6,223,417 B1 | 5/2001 | Saban et al. | |
| 6,250,258 B1 | 6/2001 | Liebig | |
| 6,259,166 B1 | 7/2001 | Tommer | |
| 6,270,309 B1 | 8/2001 | Ghetzler et al. | |
| 6,290,024 B1 | 9/2001 | Ehlert | |
| 6,304,015 B1 | 10/2001 | Filatov et al. | |
| 6,324,494 B1 | 11/2001 | Saban | |
| 6,325,142 B1 | 12/2001 | Bosley et al. | |
| 6,343,570 B1 | 2/2002 | Schmid et al. | |
| 6,388,356 B1 | 5/2002 | Saban | |
| D459,796 S | 7/2002 | Moreno | |
| 6,422,017 B1 | 7/2002 | Bassily | |
| 6,437,468 B2 | 8/2002 | Stahl et al. | |
| 6,465,924 B1 | 10/2002 | Maejima | |
| 6,504,337 B1 | 1/2003 | Saban et al. | |
| 6,539,720 B2 * | 4/2003 | Rouse et al. | 60/651 |
| 6,598,397 B2 | 7/2003 | Hanna et al. | |
| 6,663,347 B2 | 12/2003 | Decker et al. | |
| 6,664,680 B1 | 12/2003 | Gabrys | |
| 6,692,222 B2 | 2/2004 | Frinz et al. | |
| 6,700,258 B2 | 3/2004 | McMullen et al. | |
| 6,727,617 B2 | 4/2004 | McMullen et al. | |
| 6,777,847 B1 | 8/2004 | Saban et al. | |
| 6,793,042 B2 | 9/2004 | Brouillet | |
| 6,794,780 B2 | 9/2004 | Silber et al. | |
| 6,856,062 B2 | 2/2005 | Heiberger et al. | |
| 6,876,194 B2 | 4/2005 | Lin et al. | |
| 6,880,344 B2 | 4/2005 | Radcliff et al. | |
| 6,897,587 B1 | 5/2005 | McMullen et al. | |
| 6,900,553 B2 | 5/2005 | Gozdawa | |
| 6,934,666 B2 | 8/2005 | Saban et al. | |
| 6,960,840 B2 | 11/2005 | Willis et al. | |
| 6,967,461 B1 | 11/2005 | Markunas et al. | |
| 6,986,251 B2 | 1/2006 | Radcliff et al. | |
| 7,019,412 B2 | 3/2006 | Ruggieri et al. | |
| 7,042,118 B2 | 5/2006 | McMullen et al. | |
| 7,047,744 B1 | 5/2006 | Robertson et al. | |
| 7,075,399 B2 | 7/2006 | Saban et al. | |
| 7,100,380 B2 | 9/2006 | Brasz et al. | |
| 7,125,223 B2 | 10/2006 | Turnquist et al. | |
| 7,146,813 B2 | 12/2006 | Brasz et al. | |
| 7,174,716 B2 | 2/2007 | Brasz et al. | |
| 7,208,854 B1 | 4/2007 | Saban et al. | |
| 7,225,621 B2 | 6/2007 | Zimron et al. | |
| 7,387,189 B2 | 6/2008 | James et al. | |
| 7,436,922 B2 | 10/2008 | Peter | |
| 7,557,480 B2 | 7/2009 | Filatov | |
| 7,581,921 B2 | 9/2009 | Bagepalli et al. | |
| 7,594,399 B2 | 9/2009 | Lehar et al. | |
| 7,638,892 B2 | 12/2009 | Myers | |
| 7,793,505 B2 | 9/2010 | Dooley | |
| 7,841,306 B2 | 11/2010 | Myers et al. | |
| 7,942,001 B2 * | 5/2011 | Radcliff et al. | 60/651 |
| 8,061,139 B2 | 11/2011 | Bronicki | |
| 8,341,960 B2 * | 1/2013 | Berger et al. | 60/641.2 |
| 8,375,716 B2 | 2/2013 | Ramaswamy et al. | |
| 8,739,538 B2 | 6/2014 | Myers et al. | |
| 2003/0074165 A1 | 4/2003 | Saban et al. | |
| 2004/0020206 A1 | 2/2004 | Sullivan et al. | |
| 2004/0027011 A1 | 2/2004 | Bostwick et al. | |
| 2004/0189429 A1 | 9/2004 | Saban et al. | |
| 2005/0093391 A1 | 5/2005 | McMullen et al. | |
| 2005/0262848 A1 | 12/2005 | Held | |
| 2006/0185366 A1 | 8/2006 | Kahlbau et al. | |
| 2007/0018516 A1 | 1/2007 | Pal et al. | |
| 2007/0056285 A1 | 3/2007 | Brewington | |
| 2007/0063594 A1 | 3/2007 | Huynh | |
| 2007/0200438 A1 | 8/2007 | Kaminski et al. | |
| 2007/0204623 A1 | 9/2007 | Rollins | |
| 2008/0103632 A1 | 5/2008 | Saban et al. | |
| 2008/0224551 A1 | 9/2008 | Saban et al. | |
| 2008/0246281 A1 | 10/2008 | Agrawal et al. | |
| 2008/0246373 A1 | 10/2008 | Filatov | |
| 2008/0250789 A1 | 10/2008 | Myers et al. | |
| 2008/0252077 A1 | 10/2008 | Myers | |
| 2008/0252078 A1 | 10/2008 | Myers et al. | |
| 2009/0004032 A1 | 1/2009 | Kaupert | |
| 2009/0126371 A1 | 5/2009 | Bujac et al. | |
| 2009/0217693 A1 | 9/2009 | Kikuchi et al. | |
| 2009/0301078 A1 | 12/2009 | Chillar et al. | |
| 2010/0043439 A1 | 2/2010 | Lourenco et al. | |

(56) References Cited

U.S. PATENT DOCUMENTS

| | | | |
|---|---|---|---|
| 2010/0071368 A1 | 3/2010 | Bronicki et al. | |
| 2010/0126172 A1 | 5/2010 | Sami | |
| 2010/0263380 A1 | 10/2010 | Biederman et al. | |
| 2010/0319346 A1* | 12/2010 | Ast et al. | 60/616 |
| 2010/0326076 A1 | 12/2010 | Ast et al. | |
| 2011/0061388 A1 | 3/2011 | Lehar et al. | |
| 2011/0138809 A1 | 6/2011 | Ramaswamy et al. | |
| 2011/0289922 A1 | 12/2011 | Myers et al. | |

FOREIGN PATENT DOCUMENTS

| | | |
|---|---|---|
| EP | 1905948 A1 | 4/2008 |
| GB | 2225813 A | 6/1990 |
| GB | 2405450 A | 3/2005 |
| JP | 55075502 | 6/1980 |
| JP | 57068507 | 4/1982 |
| JP | 63129839 | 6/1988 |
| JP | 63277443 | 11/1988 |
| JP | 63277443 A | 11/1988 |
| JP | 3271507 A | 12/1991 |
| JP | 8218816 | 8/1996 |
| JP | 9112207 | 4/1997 |
| JP | 2001078390 | 3/2001 |
| JP | 2007127060 | 5/2007 |
| WO | 9301397 | 1/1993 |
| WO | 03100946 | 12/2003 |
| WO | 2006/104490 A1 | 10/2006 |
| WO | 2007088194 | 8/2007 |
| WO | 2008061271 | 5/2008 |
| WO | 2008090628 | 7/2008 |
| WO | 2009/045117 A2 | 4/2009 |
| WO | 2010143046 | 12/2010 |
| WO | 2011/117074 A1 | 9/2011 |

OTHER PUBLICATIONS

Search report issued in connection with GB Application No. 1222997.7, May 3, 2013.

International Search Report Issued in Connection with WO Application No. PCT/US2011/036024, Nov. 4, 2011.

York International Service Instructions for Liquid Cooled Optispeed Compressor Drive, 2004, 52 pages.

Johnson Controls Inc. "Model YMC2 Magnetic Bearing Centrifugal Liquid Chillers Design LevelA," 2010, 54 pages.

JP 8218816 A (Machine Translation from JPO), http://dossier1.ipdl.inpit.go.jp/AIPN/odse_top_dn.ipdi?N000=7400 Aug. 27, 1996.

International Search Report Issued in Connection with PCT/US2011/036638, Sep. 1, 2011.

International Search Report Issued in Connection with PCT/US2011/037710, Oct. 4, 2011.

European Office Action issued in Connection with EP Application No. 08 745 761.0, Jan. 1, 2011.

GE Oil & Gas, "Turboexpander-Generators for Natural Gas Applications," [onlin], <http://www.ge-energy.com/businesses/ge oilandgas/en/literalure/en/downloads/turbo generators.pdf>, 7 pages, retrieved May 19, 2010.

Atlas Copco, "Atlas Copco Gas and Process Solutions, Driving Expander Technology," [online]<http://www.atlascopcogap.com/download_file.php?id=457?, 24 pp. retrieved May 19, 2010.

Atlas Copco, "Atlas Copco Gas and Process Solutions, GT and T Series: Process-engineered Centrifugal Compressors," [online]<http://hv'Arw.atlascopco-gap.Cojti/download ftic.D13]2?id=3 23>, 24 pp. retrieved May 19, 2010.

Atlas Copco, "Atlas Copco Gas and Process Solutions, Producing Tomorrow's Energy," [online]<http://www. atlascopco-gap.com/download_file.php?id=458?8 ages, retrieved May 19, 2010.

International Search Report for PCT/US2008/060324 dated Jan. 9, 2010.

International Search Report and Written Opinion of the International Searching Authority issued in corresponidng International Application No. PCTIUS2008/060227 on Oct. 28, 2008; 12 pages.

International Search Report and Written Opinion of the International Searching Authority issued in International Application No. PCT/US2008/057082 on Jul. 8, 2008; 8 pages.

International Preliminary Report on Patentability issued in International Application No. PCT/US2008/057082 on Mar. 16, 2009; 10 pages.

International Preliminary Report on Patentability issued in International Application No. PCT/US2008/060227; Jun. 17, 2009; 10 pages.

Hawkins, Lawrence A. et al., "Application of Permanent Magnet Bias Magnetic Bearings to an Energy Storage Flywheel," Fifth Symposium on Magnetic Suspension Technology, Santa Barbara, CA, Dec. 1-3, 1999, pp. 1-15.

Hawkins, Lawrence A. et al., "Analysis and Testing of a Magnetic Bearing Energy Storage Flywheel with Gain-Scheduled, Mimo Control," Proceedings of ASME Turboexpo 2000, Munich, Germany, May 8-11, 2000, pp. 1-8.

McMullen, Patrick T. et al., "Combination Radial-Axial Magnetic Bearing," Seventh International Symposium on Magnetic Bearing, ETH Zurich, Aug. 23-25, 2000, pp. 473-478.

Hawkins, Lawrence et al., "Shock and Vibration Testing of an AMB Supported Energy Storage Flywheel," 8th International Symposium on Magnetic Bearings, Mito, Japan, Aug. 26-28, 2002, 6 pages.

McMullen, Patrick T. et al., "Design and Development of a 100 KW Energy Storage Flywheel for UPS and Power Conditioning Applications," 24th International PCIM Conference, Nuremberg, Germany, May 20-22, 2003, 6 pages.

Hawkins, Larry et al., "Development of an AMB Energy Storage Flywheel for Industrial Applications," 7th International Symposium on Magnetic Suspension Technology, Fukoka, Japan, Oct. 2003, 7 pages.

Hawkins, Larry et al., "Development of an Amb Energy Storage Flywheel for Commercial Application," International Symposium on Magnetic Suspension Technology, Dresden, Germany, Sep. 2005, 5 pages.

Huynh, Co et al., "Flywheel Energy Storage System for Naval Applications," GT 2006-90270, Proceedings of Gt 2006 ASME Turbo Expo 2006: Power for Lan, Sea, Air, Barcelona, Spain, May 8-11, 2006, pp. 1-9.

McMullen, Patrick et al., "Flywheel Energy Storage System with AMB's and Hybrid Backup Bearings," Tenth International Symposium on Magnetic Bearings, Martigny, Switzerland, Aug. 21-23, 2006, 6 pages.

PureCycle: Overview, "Super-efficient, reliable, clean energy-saving alternatives—the future is here," (1 page) available at http://www.utcpower.com/fs/com/bin/fs_com_Page/0,5433,03400,00.html, printed Jul. 26, 2006.

Ormat Web Site: "Recovered Energy Generation in the Cement Industry," (2 pages) available at http://www.ormat.com/.technology_cement_2.htm, printed Jul. 26, 2006.

Turboden—Organic Rankine Cycle, "Turboden High Efficiency Rankine for Renewable Energy and Heat Reovery," (2 pages) available at http://www.turboden.it/orc.asp, 1999-2003, printed Jul. 27, 2006.

Turboden—Applications, "Turboden High Efficiency Rankine for Renewable Energy and Heat Reovery," (1 page) available at http://www.turboden.it/applications_detail_asp?titolo=Heat+recovery, 1999-2003, printed Jul. 27, 2006.

Freepower ORC Electricity Company Home page, "Welcome to Freepower," (1 page) available at http://www.freepower.co.uk/, Jul. 18, 2006.

Freepower ORC Electricity Company with Landfill Flarestacks, Flarestacks (Landfill & Petrochemical), (1 page).available at http://www.freepowerco.uk/site-2.htm, 2000-2006, printed Jul. 26, 2006.

Freepower ORC Electricity Company with Industrial Processes, "Industrial Processed," (1 page) available at http://.www.freepower.co.uk/site-5.htm, 2000-2006, printed Jul. 26, 2006.

Freepower ORC Electricity Company FP6 Product Description, "FP6," (1 page) available at http://www.freepower.co.uk/fp6.htm, 2000-2006, printed Jul. 26, 2006.

(56) References Cited

OTHER PUBLICATIONS

Freepower ORC Electricity Company FP120 Product Description, "FP120," (1 page) available at http://www.freepower.co.uk/fp120.htm, 2000-2006, printed Jul. 26, 2006.

Freepower ORC Electricity Company FP60 Product Description, "FP60," (1 page) available at http://www.freepower.co.uk/fp60.htm, 2000-2006, printed Jul. 26, 2006.

Freepower ORC Electricity Company Products Overview "A System Overview," (1 page) available at http://www.freepower.co.uk/tech-overview.htm, 2000-2006, printed Jul. 26, 2006.

Freepower FP6, "Freepower FP6 Specification & Dimensions for 6kWe Electricity Generating Equipment," (2 pages) 2000-2004, printed Jul. 26, 2006.

Honeywell, "Genetron®245fa Applications Development Guide," (15 pages), 2000.

* cited by examiner

WASTE HEAT RECOVERY SYSTEMS

BACKGROUND OF THE INVENTION

The subject matter disclosed herein relates to waste heat recovery systems, and more specifically, to waste heat recovery systems that employ nonpolar organic solvents as working fluids.

Waste heat recovery systems may be employed to recover low-grade heat, such as heat with a temperature below approximately 500° C., from industrial and commercial processes and operations. For example, waste heat recovery systems may be employed to recover low-grade heat from hot exhaust gases produced by gas turbines. Waste heat recovery systems that implement an organic Rankine cycle (ORC) by circulating an organic working fluid may be particularly efficient at recovering low-grade heat due to the relatively low phase change enthalpies of organic working fluids.

In general, ORC systems may circulate an organic working fluid in a closed loop through a cycle of expansion and pressurization to convert heat into work. For example, the working fluid may be directed through a heat exchanger where the working fluid may absorb heat from a heat source, such as exhaust gas, to vaporize the working fluid. The vaporized working fluid may then be expanded across a turbine to drive a load, such as a generator, that produces electricity. The expanded working fluid may then be directed to another heat exchanger to condense the working fluid into a liquid. The liquid working fluid may then be pressurized in a pump and returned to the first heat exchanger. Typical ORC systems may employ a refrigerant, such as R143a or R245fa, as the organic working fluid and may operate at temperatures of approximately 80° C. to 100° C. However, it may be desirable to operate at higher cycle temperatures to increase the system efficiency and power output.

BRIEF DESCRIPTION OF THE INVENTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In a first embodiment, a waste heat recovery system includes a first organic Rankine cycle system, a second organic Rankine cycle system, and a third organic Rankine cycle system. The first organic Rankine cycle system includes a first heat exchanger configured to transfer heat from a heat source to a first working fluid to vaporize the first working fluid, and a first integrated power module configured to expand the first working fluid to generate electricity. The second organic Rankine cycle includes a second heat exchanger configured to transfer heat from the first working fluid to a second working fluid to vaporize the second working fluid, and a second integrated power module configured to expand the second working fluid to generate electricity. The third organic Rankine cycle system includes a third heat exchanger configured to transfer heat from the second working fluid to a third working fluid to vaporize the third working fluid, and a third integrated power module configured to expand the third working fluid to generate electricity.

In a second embodiment, a waste heat recovery system includes a first organic Rankine cycle system, a second organic Rankine cycle system, and a third organic Rankine cycle system. The first organic Rankine cycle system includes a first heat exchanger configured to transfer heat from a heat source to a first working fluid to vaporize the first working fluid, and a first integrated power module configured to expand the first working fluid to generate electricity. The second organic Rankine cycle includes a second heat exchanger configured to transfer heat from the first working fluid to a second working fluid to vaporize the second working fluid, and a second integrated power module configured to expand the second working fluid to generate electricity. The third organic Rankine cycle system includes a third heat exchanger configured to transfer heat from the second working fluid to cyclohexane to vaporize the cyclohexane, and a third integrated power module that includes a turbine and a permanent magnet generator. The turbine is configured to expand the cyclohexane to drive the permanent magnet generator to generate electricity.

In a third embodiment, a method includes circulating a first working fluid through a first organic Rankine cycle to heat and expand the first working fluid to generate electricity within a first integrated power module. The method also includes circulating a second working fluid through a second organic Rankine cycle to transfer heat from the first working fluid to the second working fluid and to expand the second working fluid to generate electricity within a second integrated power module. The method further includes circulating a third working fluid through a third organic Rankine cycle to transfer heat from the second working fluid to the third working fluid and to expand the third working fluid to generate electricity within a third integrated power module.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION OF THE INVENTION

Figure 1:
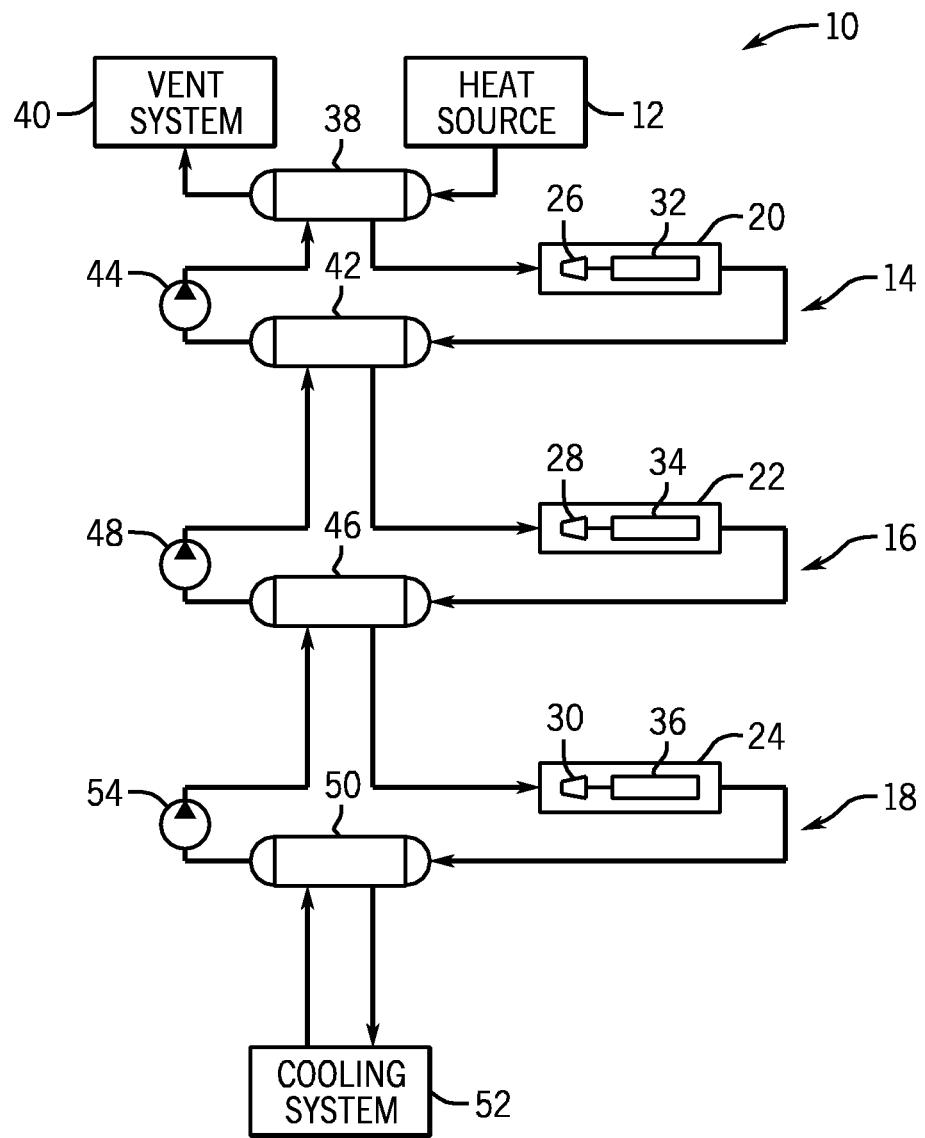
FIG. 1 is a diagrammatical representation of an embodiment of a waste heat recovery system.

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

The present disclosure is directed to waste heat recovery systems that employ nonpolar organic solvents as working fluids. The use of nonpolar organic solvents as working fluids may enable the waste heat recovery systems to operate at relatively higher cycle temperatures (e.g., 180° C. to 250° C.) as compared to traditional waste heat recovery systems that employ lower temperature fluids, such as R134a or R245fa, and that operate at cycle temperatures of approximately 80° C. to 120° C. According to certain embodiments, the nonpolar organic solvents may include toluene and/or cyclohexane. Further, the nonpolar organic solvents may include nonpolar organic solvents with a lower solubility than cyclohexane, such as propane, butane, isobutane, n-pentane, isopentane, isohexane, hexane, or combinations thereof, among others. The use of the nonpolar organic solvents described herein may be particularly well-suited to recovering heat in the low to intermediate temperature range of approximately 100° C. to 300° C., or more specifically, approximately 150° C. to 250° C., and all subranges therebetween.

The waste heat recovery systems may include multiple organic Rankine cycle (ORC) systems arranged in a cascade configuration, with each consecutive ORC system operating at a lower cycle temperature than the preceding ORC system. Each ORC system may direct the working fluid through a cycle of expansion and pressurization to convert waste heat to electricity. In particular, each ORC system may include an integrated power module that includes a turbine and a generator within a single, unitary housing. The working fluid may enter the integrated power module in the vapor phase and may be expanded as it flows through the turbine, which in turn may drive the generator to produce electricity. The working fluid exiting the turbine may then be directed past components of the generator to provide cooling for the generator. Further, in certain embodiments, a portion of the working fluid, such as the working fluid that flows through the seals, may bypass the turbine and join with the working fluid exiting the turbine. The bypass working fluid also may be used to provide cooling for the generator. Accordingly, the interior components of the integrated power module may be designed to be compatible with the working fluid that flows through the integrated power module at elevated temperatures. For example, according to certain embodiments, a protective layer may be disposed on and/or around electrical windings of the generator to inhibit contact of the working fluid with the electrical windings.

FIG. 1 depicts a waste heat recovery system 10 that may employ nonpolar organic solvents as working fluids to convert waste heat to electricity. The waste heat recovery system 10 may recover heat from a heat source 12. According to certain embodiments, the heat source 12 may be exhaust gas generated by a gas turbine engine, micro-turbine, reciprocating engine, or geothermal, solar thermal, industrial, chemical or petrochemical processing, or residential heat source. However, in other embodiments, the heat source 12 may be provided by any suitable power generation system that produces waste heat, which can be at temperatures as high as 500° C.

The waste heat recovery system 10 includes multiple ORC systems 14, 16, and 18 arranged in a high efficiency cascade configuration to transfer heat between the ORC systems. Each ORC system 14, 16, and 18 may include a closed loop that circulates a working fluid through a Rankine cycle within the ORC system 14, 16, or 18. The high temperature ORC system 14 may receive heat from the heat source 12 to vaporize the working fluid within the ORC system 14. Heat from the high temperature ORC system 14 may then be transferred to the intermediate temperature ORC system 16 to vaporize the working fluid within the intermediate temperature ORC system 16. Moreover, heat from the intermediate temperature ORC system 16 may then be transferred to the low temperature ORC system 18 to vaporize the working fluid within the low temperature ORC system 18.

Each ORC system 14, 16, and 18 may circulate a nonpolar organic working fluid. According to certain embodiments, the working fluids employed in the ORC systems 14 and 16 may be high temperature nonpolar organic working fluids, such as toluene, siloxanes, thiophene, hydrocarbon refrigerants, or other suitable high temperature nonpolar organic working fluids. Further, in certain embodiments, each ORC system 14 and 16 may circulate a different working fluid. For example, the working fluid employed within the high temperature ORC system 14 may have a condensation temperature that is greater than the boiling point of the working fluid employed within intermediate temperature ORC system 16. However, in other embodiments, the ORC systems 14 and 16 may both employ the same working fluid.

The working fluid employed in the low temperature ORC system 18 may be a low temperature nonpolar organic working fluid, as compared to the working fluids employed in the high temperature and intermediate temperature ORC systems 14 and 16. For example, the working fluid employed within the low temperature ORC system 18 may be a nonpolar organic solvent that has a boiling point that is lower than the condensation temperature of the working fluid employed within the intermediate temperature ORC system 16. According to certain embodiments, the working fluid employed in the ORC system 18 may include cyclohexane. However, in other embodiments, any other suitable low temperature nonpolar organic solvent may be employed, such as propane, butane, isopentane, isobutane, cyclohexane-propane, cyclohexane-butane, cyclopentane-butane, or cyclopentane-pentafluoropropane, among others. In certain embodiments, the working fluid employed in the low temperature ORC system 18 may include a nonpolar organic solvent that has a solubility that is less than or equal to the solubility of cyclohexane, as measured by the Hildebrand solubility parameters. For example, the working fluid may include propane, butane, isobutane, n-pentane, isopentane, isohexane, hexane, or combinations thereof, among others. According to certain embodiments, the ORC system 18 may employ a nonpolar organic solvent with a critical temperature of approximately 100 to 300° C. to facilitate the recovery of waste heat in the temperature range of approximately 150 to 250° C. As may be appreciated the individual working fluids used within each ORC system 14, 16, and 18 may depend on parameters, such as the temperature of the heat source 12 and the size and type of equipment included within the ORC systems, among others.

Each ORC system 14, 16, and 18 includes an integrated power module 20, 22, or 24 that converts heat to electricity. Each integrated power module 20, 22, and 24 includes a turbine 26, 28, or 30 and a generator 32, 34, or 36 contained in a single, unitary housing. According to certain embodiments, the turbine 26, 28, or 30 and the generator 32, 34, or 36 of each integrated power module 20, 22, and 24 may be contained within a hermetically sealed housing without a shaft seal. In these embodiments, no external shaft seals may be employed; however, internal seals may be employed to form a boundary between the high-pressure and low-pressure sides of the turbine. Further, in certain embodiments, the turbines 26, 28, and 30 may include radial turbines, and the generators 32, 34, and 36 may include high speed, permanent magnet generators. However, in other embodiments, other suitable types of turbines and/or generators may be employed. Vapor phase working fluid may enter each integrated power module 20, 22, and 24 and expand as it flows through the turbine 26, 28, or 30 to drive the generator 32, 34, or 36, as discussed further below with respect to FIG. 4. Further, in certain embodiments, a portion of the working fluid may bypass the turbine, flow through the internal seals, and then join with the working fluid exiting the turbine. The bypass working fluid and the working fluid exiting the turbine may provide cooling for the generator.

The high temperature ORC system 14 includes a heat exchanger 38 that transfers heat from the heat source 12 to the working fluid flowing through the heat exchanger 38. According to certain embodiments, the heat exchanger 38 may be designed to directly transfer heat from the heat source 12 to the working fluid. For example, the heat exchanger 38 may be a boiler that receives exhaust gas from the heat source 12 and transfer heat from the exhaust gas to the working fluid flowing through tubes within the heat exchanger 38. In these embodiments, the cooled exhaust gas exiting the heat exchanger 38 may be directed to a vent control system 40 that regulates release of the cooled exhaust gas to the environment. However, in other embodiments, the heat exchanger may be designed to receive an intermediate fluid, such as thermal oil, that has been heated by the heat source 12. In these embodiments, the heat exchanger may be a shell and tube heat exchanger, shell and plate heat exchanger, or the like, that transfers heat from the intermediate fluid to the working fluid flowing through the heat exchanger 38.

Within the heat exchanger 38, the working fluid may absorb heat from the heat source to vaporize the working fluid. In certain embodiments, the working fluid may be heated to a temperature of approximately 400° C. Upon exiting the heat exchanger 38, the vapor phase working fluid may then flow to the integrated power module 20. Within the integrated power module 20, the working fluid may be expanded as it flows through the turbine 26 to drive the generator 32. For example, as the working fluid expands, the working fluid may rotate blades or a wheel of the turbine, which may be coupled to the generator 32. The expanded working fluid may exit the turbine 26 as a low temperature and pressure vapor that flows past and/or through the generator 32 to exit the integrated power module 20.

From the integrated power module 20, the working fluid may enter a heat exchanger 42 as a low temperature and pressure vapor. The heat exchanger 42 circulates the working fluid of the high temperature ORC system 14, as well as the working fluid of the intermediate temperature ORC system 16. Accordingly, the heat exchanger 42 may be a shared heat exchanger that is common to both the high temperature ORC system 14 and the intermediate temperature ORC system 16. Within the heat exchanger 42, the working fluid of the high temperature ORC system 14 may transfer heat to the working fluid of the intermediate temperature ORC system 16 to condense the working fluid of the high temperature ORC system 14 into a liquid. The liquid phase working fluid may then flow through a pump 44 that pressurizes the working fluid and circulates the working fluid within the ORC system 14. From the pump 44, the working fluid may then return to the heat exchanger 38 where the cycle may begin again.

Through the shared heat exchanger 42, the working fluid flowing within the high temperature ORC system 14 may transfer heat to the working fluid flowing within the intermediate temperature ORC system 16. Specifically, as the working fluid of the intermediate temperature ORC system 16 flows through the shared heat exchanger 42, the working fluid of the intermediate temperature ORC system 16 may absorb heat from the working fluid of the high temperature ORC system 14 to vaporize the working fluid of the intermediate ORC system 16. In certain embodiments, the working fluid may be heated to a temperature of approximately 300° C. The vapor phase working fluid may then enter the integrated power module 22 where the working fluid may be expanded as it flows through the turbine 28 to drive the generator 34. The expanded working fluid may exit the turbine 28 as a low temperature and pressure vapor that flows past and/or through the generator 34 to exit the integrated power module 22.

From the integrated power module 22, the working fluid may enter a heat exchanger 46 as a low temperature and pressure vapor. The heat exchanger 46 circulates the working fluid of the intermediate temperature ORC system 16, as well as the working fluid of the low temperature ORC system 18. Accordingly, the heat exchanger 46 may be a shared heat exchanger that is common to both the intermediate temperature ORC system 16 and the low temperature ORC system 18. Within the heat exchanger 46, the working fluid of the intermediate temperature ORC system 16 may transfer heat to the working fluid of the low temperature ORC system 18 to condense the working fluid of the intermediate temperature ORC system 16 into a liquid. The liquid phase working fluid may then flow through a pump 48 that pressurizes the working fluid and circulates the working fluid within the ORC system 16. From the pump 48, the working fluid may then return to the heat exchanger 42 where the cycle may begin again.

Through the shared heat exchanger 46, the working fluid flowing within the intermediate temperature ORC system 16 may transfer heat to the working fluid flowing within the low ORC system 18. Specifically, as the working fluid of the low temperature ORC system 18 flows through the shared heat exchanger 46, the working fluid of the low temperature ORC system 18 may absorb heat from the working fluid of the intermediate temperature ORC system 16 to vaporize the working fluid of the low temperature ORC system 18. In certain embodiments, the working fluid may be heated to a temperature of approximately 200° C. The vapor phase working fluid may then enter the integrated power module 24 where the working fluid may be expanded as it flows through the turbine 30 to drive the generator 36. According to certain embodiments, the temperature of the working fluid entering the integrated power module 24 may be greater than approximately 150° C. to 200° C., and all subranges therebetween. More specifically, the temperature of the working fluid entering the integrated power module 24 may be greater than approximately 150° C. to 180° C., and all subranges therebetween. The expanded working fluid may then exit the turbine 30 as a low temperature and pressure vapor that flows past and/or through the generator 36 to exit the integrated power module 24.

From the integrated power module 24, the working fluid may flow through a heat exchanger 50 where the working fluid may be condensed by a cooling fluid circulated through the heat exchanger 50 by a cooling system 52. According to certain embodiments, the cooling system 52 may circulate a cooling fluid, such as water, to the heat exchanger 50 from a cooling tower or cooling reservoir. Further, in other embodiments, the cooling system 52 may be a cooling system, such as a chilled water system, used in other areas of the process or facility that includes the heat source 12. Moreover, in yet other embodiments, the heat exchanger 50 may be an air-to-liquid heat exchanger and the cooling system 52 may include a fan and motor that draw ambient air across the heat exchanger 50.

The liquid phase working fluid exiting the heat exchanger 50 may then flow through a pump 54 that pressurizes the working fluid and circulates the working fluid within the ORC system 18. From the pump 54, the working fluid may return to the heat exchanger 46 where the cycle may begin again.

The cascade arrangement of the ORC systems 14, 16, and 18 may generally allow an increased amount of heat recovery over a larger temperature range, as compared to non-cascade systems. For example, the high temperature ORC system 14 may allow recovery of heat in higher temperature ranges, such as approximately 350 to 500° C., while the intermediate temperature ORC system 16 may allow recovery of heat in intermediate temperature ranges, such as approximately 250° C. to 350° C. Further, the low temperature ORC system 18 may allow recovery of heat in low to intermediate temperature ranges, such as approximately 150° C. to 250° C. As discussed above, the low temperature ORC system 18 may employ a nonpolar organic solvent as the working fluid to facilitate the recovery of heat in the low to intermediate temperature range. According to certain embodiments, the nonpolar organic solvent may have a critical temperature in the range of approximately 100° C. to 300° C., and may have a solubility that is less than or equal to the solubility of cyclohexane, as measured by the Hildebrand solubility parameters. As may be appreciated, the temperature ranges are provided by way of example, and are not meant to be limiting. In other embodiments, the temperatures existing in each ORC system 14, 16, and 18 may vary depending on factors, such as they type of the heat source provided, the temperature of the heat source 12, and the number of ORC systems included within the waste heat recovery system, among others.

As may be appreciated, additional equipment such as pumps, valves, control circuitry, pressure and/or temperature transducers or switches, among others may be included within the waste heat recovery system 10. For example, each heat exchanger 38, 42, 46, and 50 may include a pressure relief valve or vent. Furthermore, the types of equipment included within the waste heat recovery system 10 may vary. For example, according to certain embodiments, the heat exchangers 38, 42, 46, and 50 may include shell and tube heat exchangers, fin and tube heat exchangers, plate heat exchangers, plate and shell heat exchangers, or combinations thereof, among others. Moreover, in other embodiments, additional ORC systems may be included within the waste heat recovery system to allow the recovery of waste heat at additional temperatures. Further, in certain embodiments, any number of ORC systems, such as 2, 3, 4, 5, or more ORC systems, may be arranged in a cascade configuration.

Figure 2:
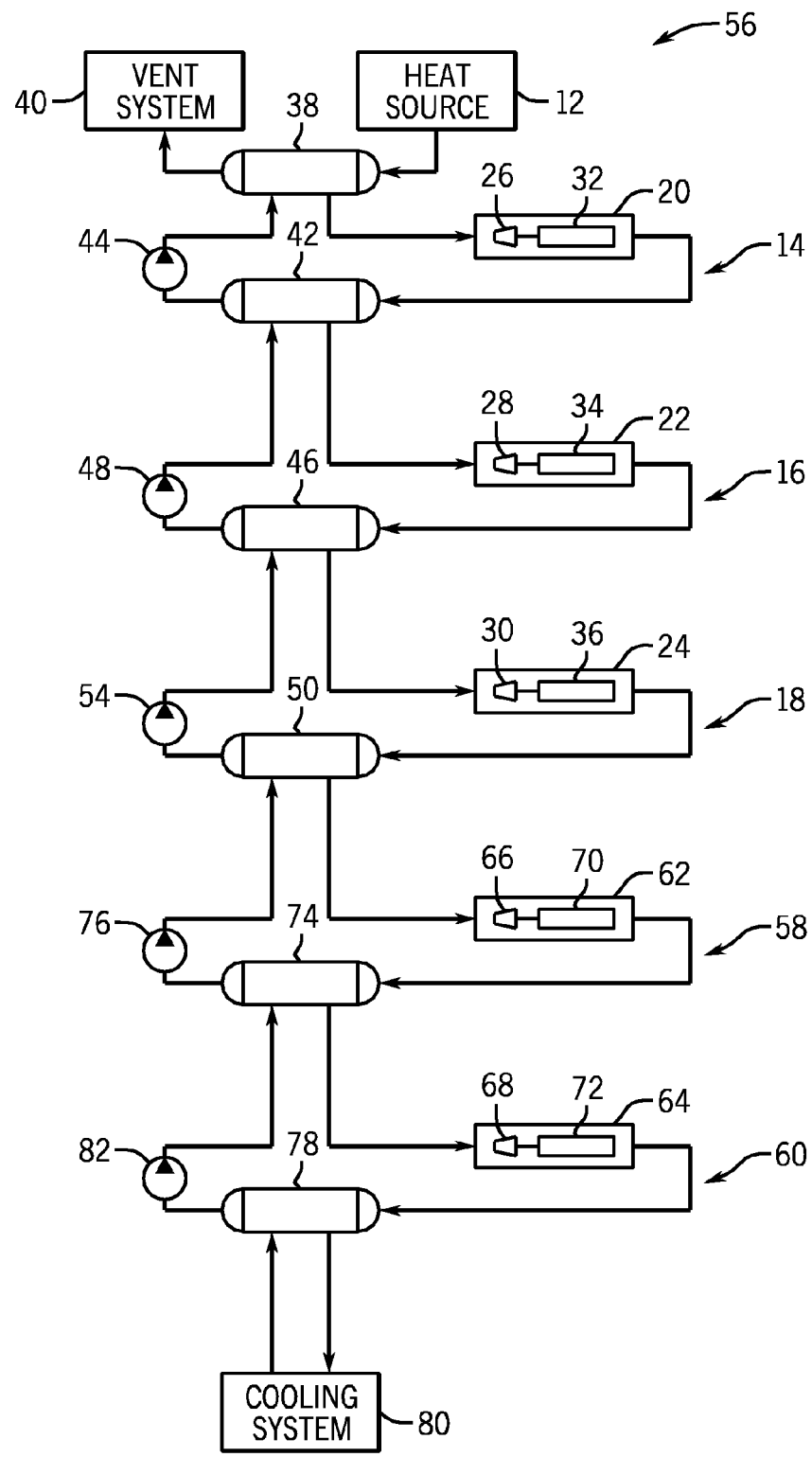
FIG. 2 is a diagrammatical representation of another embodiment of a waste heat recovery system.

FIG. 2 depicts another embodiment of a waste heat recovery system 56. The waste heat recovery system 56 may be generally similar to the waste heat recovery system 10 described above with respect to FIG. 1. However, rather than including three ORC systems as shown in FIG. 1, the waste heat recovery system 56 includes five ORC systems that allow the recovery of heat in additional temperature ranges.

The waste heat recovery system 56 includes the ORC systems 14, 16, and 18, which may operate in a manner generally similar to that described above with respect to FIG. 1. Further, the waste heat recovery system 56 includes two additional ORC systems 58 and 60 that allow the recovery of heat in additional temperature ranges. For example, the ORC system 58 may allow recovery of heat in lower temperature ranges, such as approximately 100° C. to 150° C., while the ORC system 60 may facilitate recovery of heat in even lower temperature ranges, such as approximately 50° C. to 100° C.

The working fluid employed in the ORC system 58 may be a lower temperature nonpolar organic working fluid, as compared to the working fluids employed in the ORC systems 14, 16, and 18. For example, the working fluid employed within the ORC system 58 may be a nonpolar organic solvent that has a boiling point that is lower than the condensation temperature of the working fluid employed within the low temperature ORC system 18. According to certain embodiments, the working fluid employed in the ORC system 58 may include butane, propane, or other nonpolar organic solvents that have a solubility that is less than or equal to the solubility of cyclohexane, as measured by the Hildebrand solubility parameters.

The working fluid employed in the ORC system 60 may be a lower temperature nonpolar organic working fluid, as compared to the working fluids employed in the ORC systems 14, 16, 18, and 58. For example, the working fluid employed within the ORC system 60 may be a nonpolar organic working fluid that has a boiling point that is lower than the condensation temperature of the working fluid employed within the low temperature ORC system 58. According to certain embodiments, the working fluid employed in the ORC system 60 may include R245ca, R245fa, R134a, R123, or R236fa, among others.

Each ORC system 58 and 60 includes an integrated power module 62 or 64 that converts heat to electricity, in a manner similar to that described above with respect to the integrated power modules 20, 22, and 24 (FIG. 1). Each integrated power module 60 and 62 includes a turbine 66 or 68 and a generator 70 or 72 contained in a single, unitary housing. According to certain embodiments, the turbines 66 and 68 may include radial turbines, and the generators 70 and 72 may include high speed, permanent magnet generators. However, in other embodiments, other suitable types of turbines and/or generators may be employed.

The ORC system 58 receives heat from the ORC system 18 through the shared heat exchanger 50. In particular, within the heat exchanger 50, the working fluid of the ORC system 18 may transfer heat to the working fluid flowing within the ORC system 58. Accordingly, in the embodiment shown in FIG. 2, the working fluid of the ORC system 18 is condensed by transferring heat to the working fluid of the ORC system 58, rather than by transferring heat to a cooling fluid as shown in FIG. 1. Further, as the working fluid of the ORC system 58 absorbs heat from the working fluid of the ORC system 18, the working fluid of the ORC system 58 is vaporized. In certain embodiments, the working fluid may be heated to a temperature of approximately 150° C. The vapor phase working fluid may then enter the integrated power module 62 where the working fluid may be expanded as it flows through the turbine 66 to drive the generator 70. The expanded working fluid may exit the turbine 66 as a low temperature and pressure vapor that flows past and/or through the generator 70 to exit the integrated power module 62.

From the integrated power module 62, the working fluid may enter a heat exchanger 74 as a low temperature and pressure vapor. The heat exchanger 74 circulates the working fluid from the ORC system 58, as well as the working fluid from the ORC system 60. Accordingly, the heat exchanger 74 may be a shared heat exchanger that is common to both the ORC system 58 and the ORC system 60. Within the heat exchanger 74, the working fluid of the ORC system 58 may transfer heat to the working fluid of the lowest temperature ORC system 60 to condense the working fluid of the ORC system 58 into a liquid. The liquid phase working fluid may then flow through a pump 76 that pressurizes the working fluid and circulates the working fluid within the ORC system 58. From the pump 76, the working fluid may return to the heat exchanger 50 where the cycle may begin again.

Through the shared heat exchanger 74, the working fluid flowing within the ORC system 58 may transfer heat to the working fluid flowing within the lowest temperature ORC system 60. Specifically, as the working fluid of the lowest temperature ORC system 60 flows through the shared heat exchanger 74, the working fluid of the lowest temperature ORC system 60 may absorb heat from the working fluid of the ORC system 58 to vaporize the working fluid of the lowest temperature ORC system 60. In certain embodiments, the working fluid may be heated to a temperature of approximately 100° C. The vapor phase working fluid may then enter the integrated power module 64 where the working fluid may be expanded as it flows through the turbine 68 to drive the generator 72. The expanded working fluid may exit the turbine 68 as a low temperature and pressure vapor that flows past and/or through the generator 72 to exit the integrated power module 64.

From the integrated power module 64, the working fluid may flow through a heat exchanger 78 where the working fluid may be condensed by a cooling fluid that is circulated through the heat exchanger 78 by a cooling system 80. According to certain embodiments, the cooling system 80 may circulate a cooling fluid, such as water, to the heat exchanger 78 from a cooling tower or cooling reservoir. Further, in other embodiments, the cooling system 80 may be a cooling system, such as a chilled water system, used in other areas of the process or facility that includes the heat source 12. Moreover, in yet other embodiments, the heat exchanger 78 may be an air-to-liquid heat exchanger and the cooling system 80 may include a fan and motor that draw ambient air across the heat exchanger 78.

The liquid phase working fluid exiting the heat exchanger 78 may then flow through a pump 82 that pressurizes the working fluid and circulates the working fluid within the ORC system 60. From the pump 82, the working fluid may return to the heat exchanger 74 where the cycle may begin again.

Figure 3:
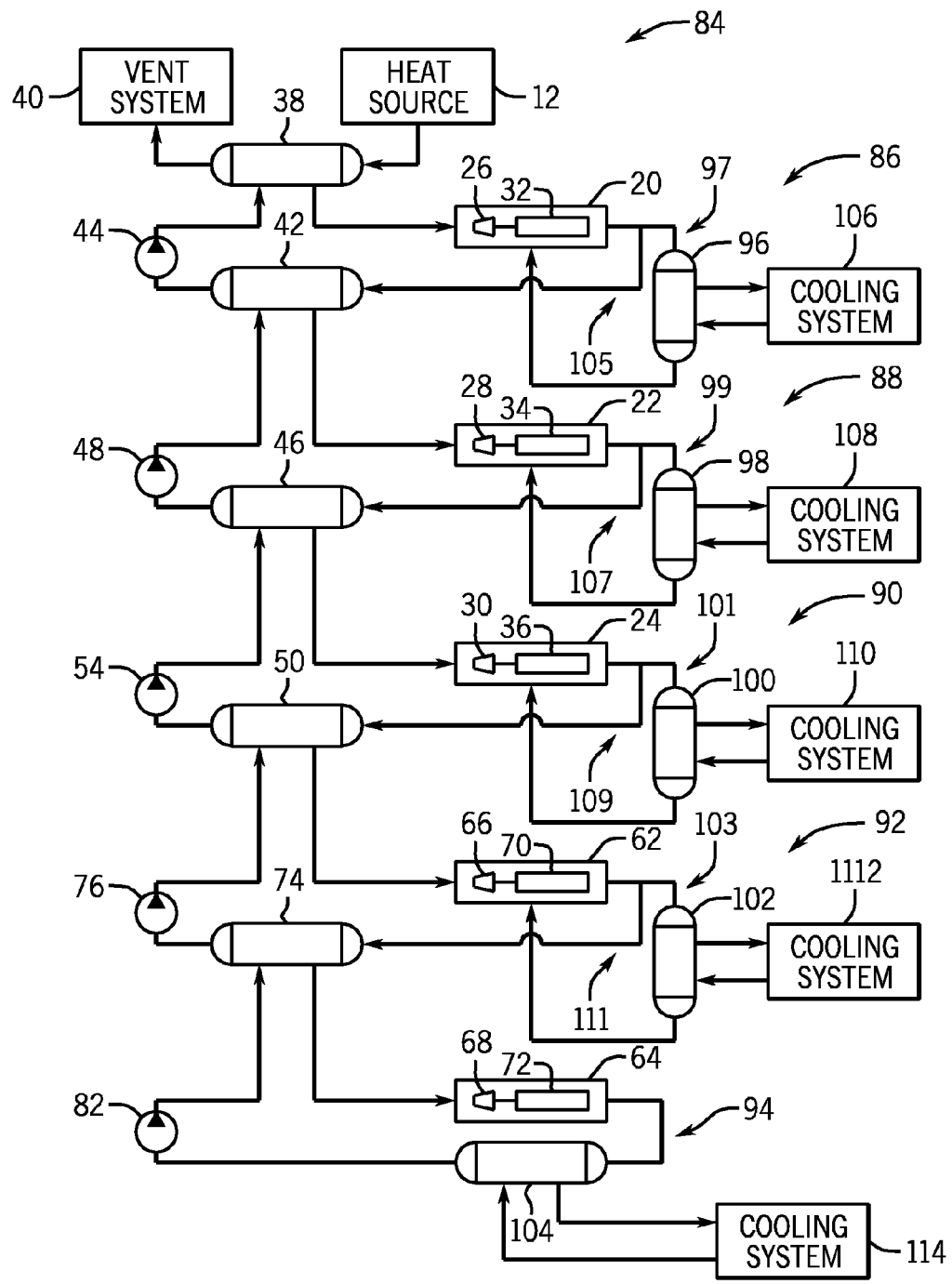
FIG. 3 is a diagrammatical representation of a further embodiment of a waste heat recovery system.

FIG. 3 depicts another embodiment of a waste heat recovery system 84. The waste heat recovery system 84 includes five ORC systems 86, 88, 90, 92, and 94 that operate in a manner generally similar to the ORC systems 14, 16, 18, 58, and 60 that are described above with respect to FIG. 2. However, the ORC systems 86, 88, 90 and 92 each may include an additional heat exchanger 96, 98, 100, and 102 disposed downstream of the integrated power module 20, 22, 24, or 62. The additional heat exchangers 96, 98, 100, and 102 also may be disposed upstream of the shared heat exchangers 42, 46, 50, and 74. The lowest temperature ORC system 94 also includes a heat exchanger 104 with a cooling system 114 designed to condense the working fluid flowing through the heat exchanger 104, in a manner similar to the cooling system 80, described above with respect to FIG. 2.

Each of the additional heat exchangers 96, 98, 100, and 102 may be designed to cool a portion 97, 99, 101, and 103 of the working fluid exiting the integrated power module 20, 22, 24, and 62. For example, within each ORC system 86, 88, 90, and 92, the working fluid exiting the integrated power module 20, 22, 24, and 62 may be split into a first portion 105, 107, 109, or 111 that is directed to the shared heat exchanger 42, 46, 50, or 74, and a second portion 97, 99, 101, or 103 that is directed to the additional heat exchanger 96, 98, 100 or 102. Each additional heat exchanger 96, 98, 100, or 102 circulates a cooling fluid from a cooling system 106, 108, 110, or 112 to cool the portion 97, 99, 101, or 103 of the working fluid. As shown in FIG. 3, the cooling systems 106, 108, 110, and 112 are separate cooling systems. However, in other embodiments, two or more of the cooling systems 106, 108, 110, and 112 may be part of a larger overall cooling system that provides cooling fluid to multiple heat exchangers 96, 98, 100, and 102. According to certain embodiments, the cooling systems 106, 108, 110, and 112 may be designed to cool the portion 97, 99, 101, or 103 of the working fluid by at least approximately 10-30° C., and all subranges therebetween.

The cooled portion 97, 99, 101, or 103 of the working fluid may then be directed to the integrated power module 20, 22, 24, or 62 to provide additional cooling for components of the generator 32, 34, 36, or 70, such as the windings and/or magnetic bearings, among others. Further, in certain embodiments, the cooled portion 97, 99, 101, or 103 of the working fluid may be designed to inhibit flow of the hotter working fluid exiting the turbine 26, 28, 30, or 66 towards certain components of the generator 32, 34, 36, or 70. Within the integrated power module 20, 22, 24, or 62, the cooled portion 97, 99, 101, or 103 of the working fluid may combine with the working fluid exiting the turbine 26, 28, 30, or 36 to form a single flow of working fluid that exits the integrated power module 20, 22, 24, or 62.

As shown in FIG. 3, the ORC systems 86, 88, 90, and 92 each include an additional heat exchanger 96, 98, 100, or 102 and cooling system 106, 108, 110, or 112. However, in other embodiments, one or more of the additional heat exchangers 96, 98, 100, or 102 and cooling systems 106, 108, 110, or 112 may be omitted. Further, in certain embodiments, the ORC system 94 may include an additional heat exchanger and associated cooling system designed to cool a portion of the working fluid that exits the integrated power module 64.

Figure 4:
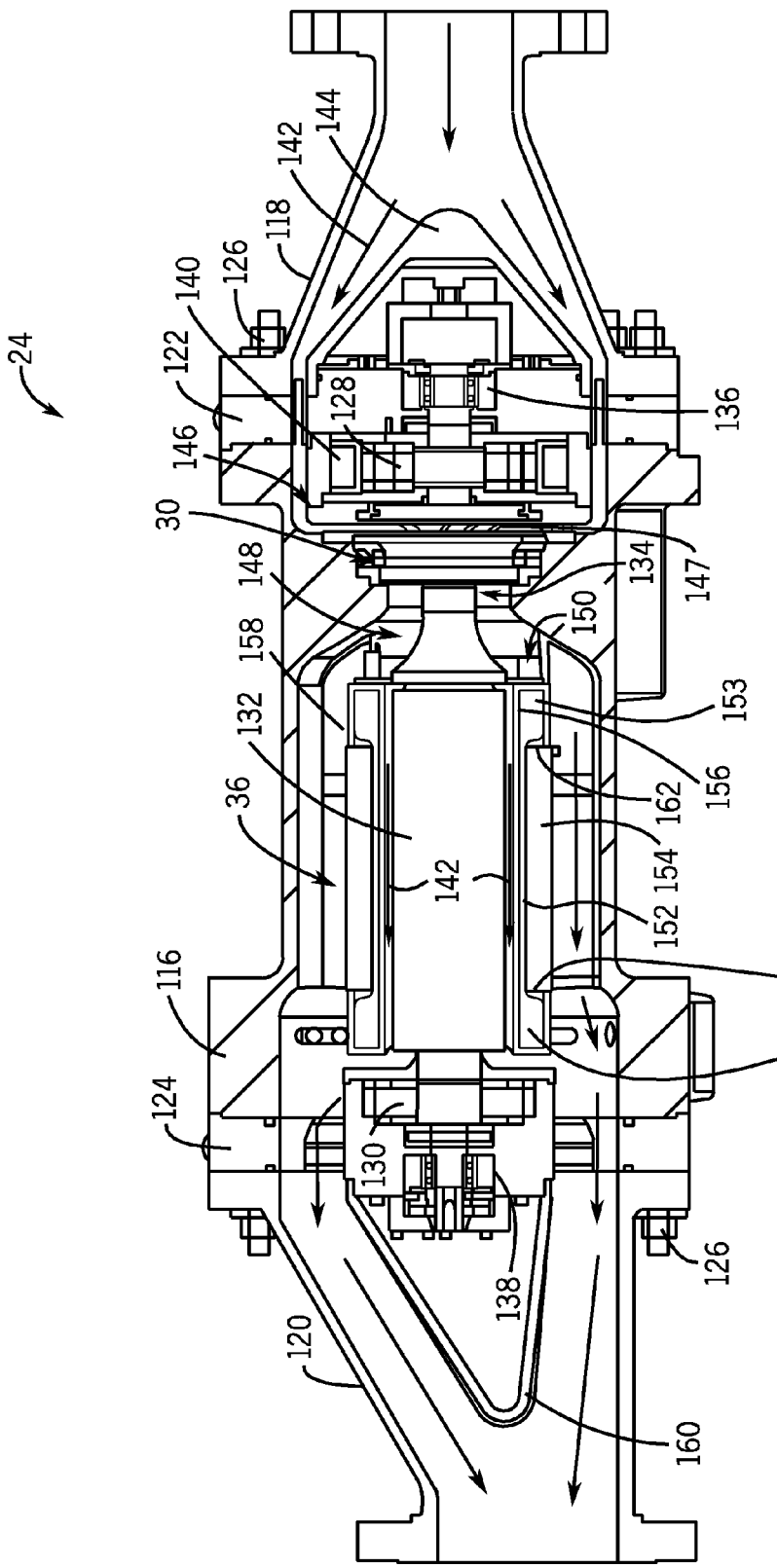
FIG. 4 is a cross-sectional view of an embodiment of an integrated power module that may be employed in the waste heat recovery systems of FIG. 1, FIG. 2, and FIG. 3.

FIG. 4 depicts an embodiment of the integrated power module 24 that may be employed in the ORC system 18. Although the integrated power module shown in FIG. 4 is described herein in the context of the integrated power module 24 employed in the ORC system 18, one or more of the other integrated power modules 20, 22, 62, and 64 may employ a similar design. Accordingly, the integrated power module shown in FIG. 4 may be employed in one or more of the other ORC systems 14, 16, 58, 60, 86, 88, 90, 92, and 94.

The integrated power module 24 includes the turbine 30 and the generator 36, described above with respect to FIG. 1, which are disposed within a casing 116. An inlet conduit 118 and an outlet conduit 120 are coupled to the casing 116 to direct the working fluid into and out of the integrated power module 24, respectively. A bearing frame 122 may be mounted between the inlet conduit 118 and the casing 116 and affixed by fasteners 126 that may extend through the inlet conduit 118, the bearing frame 122, and the casing 116. Similarly, a bearing frame 124 may be mounted between the outlet conduit 120 and the casing 116 and affixed by fasteners 126 that may extend through the outlet conduit 120, the bearing frame 124, and the casing 116.

Radial bearings 128 and 130 may be mounted on the bearing frames 122 and 124 to rotatably support the turbine 30 and a rotor 132 of the generator 36 within the casing 116. For example, the radial bearings 128 and 130 may support a shaft 134 that couples the turbine 30 to the high-speed permanent magnet (PM) rotor 132. The bearing frames 122 and 124 also may support backup bearings 136 and 138 that may be employed to support the shaft 134 when the radial bearings 128 and 130 are unavailable, for example, due to a power outage. Further, the bearing frame 122 also may support axial bearings 140 that support the turbine 30 and rotor 132 in the axial direction. As shown in FIG. 4, the radial bearings 128 and 130 and axial bearings 140 may include magnetic bearings. However, in other embodiments, the radial bearings 128 and 130 may include ball bearings, needle bearings, or journal bearings, among others.

The vapor phase working fluid may enter the integrated power module 24 through the inlet conduit 118 and may flow through the integrated power module 24 as generally indicated by arrows 142. According to certain embodiments, the working fluid may enter the integrated power module 24 at a temperature greater than approximately 150° C. to 180° C., and all subranges therebetween, and a pressure greater than or equal to approximately 8 bar. A diverter cone 144 may be disposed within the inlet conduit 118 to direct the working fluid through an inducer channel 146 to the turbine 30. The vapor phase working fluid may expand as it flows through the turbine 30, which in turn may rotate a wheel 147 of the turbine 30. The expanded working fluid may then exit the turbine 30 and flow through an exhaust conduit 148 towards the generator 36. According to certain embodiments, the working fluid exiting the turbine 30 may have a temperature greater than approximately 130 to 150° C., and all subranges therebetween, and a pressure greater than or equal to approximately 2 bar.

As disclosed above, the turbine 30 may be coupled to the generator 36, for example, by the shaft 134. Accordingly, as the turbine wheel 147 rotates, the PM rotor 132 of the generator 36 rotates synchronously to drive the generator 136. For example, permanent magnets disposed within the rotor 132 may rotate along with the rotor 132 within a stator 150 that includes magnetic windings 152 to generate electricity. End turns 153 (e.g., end windings), which are portions of the windings 152, may extend beyond the stator 150. The stator 150 may be disposed circumferentially about the rotor 132, and may generally encircle the rotor 132. According to certain embodiments, the electricity produced by the generator 36 may be transferred to an electronics package disposed outside of the casing 116 to produce electrical power. The electrical power may be AC or DC power that may be employed to power a standalone machine or facility or that may be provided to a power grid. According to certain embodiments, approximately 1 to 300 kW of power may be produced by the integrated power module 24.

The generator 36 also includes a casing 154, such as a laminate stack, that can be employed to mount the windings within the stator 150. Further, the casing 154 may enclose outer portions of the generator 36. The working fluid may flow along the casing 154 within the casing 116 of the integrated power module 124 to provide cooling to the generator 36. Further, the working fluid may flow through the generator 36 between the stator 150 and the rotor 132. In particular, the working fluid may flow between the rotor 132 and the windings 152. Moreover, in certain embodiments, in addition to receiving flow of the working fluid from the turbine 30, the generator 36 may receive working fluid diverted from another portion of the ORC system 18. For example, in certain embodiments, a portion of the working fluid exiting the heat exchanger 50 (e.g., between heat the exchanger 50 and the pump 54 or between the pump 54 and the heat exchanger 46) may be directed to the generator 36 to provide cooling and/or sealing. In these embodiments, the protective coatings described herein also may be designed to withstand exposure to the organic working fluid diverted to the generator 36 from another part of the ORC system 18.

According to certain embodiments, the temperature of the working fluid within the integrated power module 24 may range from approximately 130° C. to 250° C., or more specifically between approximately 145° C. and 180° C., and all subranges therebetween. At these elevated temperatures, the nonpolar organic solvents that are employed in the ORC system 18 may degrade components of the generator 36, such as the electrical windings 152. Accordingly, a protective layer 156 may be disposed between the rotor 132 and the stator 150 to inhibit contact of the working fluid with the windings 152. For example, the protective layer 156 may be a sleeve structure or a can structure disposed between the rotor 132 and the stator 150 to encircle the rotor 132 and abut the windings 152. According to certain embodiments, the protective layer 156 may be disposed between the windings and/or within slots of the casing 154 to provide insulation and inhibit vibration, in addition to inhibiting contact of the working fluid with the windings 152. Further, the ends of the sleeve structure may be wrapped around the end turns 153 to contact end surfaces 162 of the casing 154. Accordingly, the protective layer 156 may wrap around each end turn 153 to be disposed on opposite sides of the end turn 153.

According to certain embodiments, the protective layer 156 may include a thermoplastic polyetherimide resin, such as ultra high heat grade Ultem®, which is commercially available from SABIC of Houston, Tex. In another example, the protective layer 156 may include a polyimide resin, such as Pyre MUD, which is commercially available from Industrial Summit Technology of Parlin, N.J. In another example, the protective layer 156 may include a polytetrafluorethylene (PTFE), such as Teflon®, which is commercially available from E. I. du Pont de Nemours and Company of Wilmington, Del. In these embodiments, the PTFE may be wrapped around the windings 152 and then heated, for example, to approximately 320° C. to 340° C., and all subranges therebetween to adhere the PTFE to the windings 152. In certain embodiments, heating of the PTFE may allow the PTFE to flow into the windings 159 to provide additional insulation and inhibit winding vibration. Further, in certain embodiments, the protective layer may include an ultra high temperature thermoplastic polyimide polyetherketone blend, or another suitable thermoplastic polymer, among others. In yet another example, the protective layer 156 may include ceramic, stainless steel, or aluminum that forms a sealed cylindrical structure for the high temperature integrated power module 20.

In addition to flowing through the generator 36, the working fluid may be directed between the generator and the casing 116 by fins 158 that may be disposed along the interior of the casing 116. The fins may direct the working fluid towards the outlet conduit 120. A diverter cone 160 may be included within the outlet conduit 120 to direct the working fluid towards the exit of the integrated power module 24.

As discussed above, the waste heat recovery systems described herein may be particularly well suited to recovering waste heat over a wide range of temperatures. Further, the use of nonpolar organic solvents, such as cyclohexane, as working fluids may facilitate the recovery of waste heat in temperature ranges of approximately 100° C. to 300° C., or more specifically, approximately 150° C. to 250° C. Moreover, in certain embodiments, the waste heat recovery systems may include integrated power modules with protective layers designed to inhibit contact between the windings and the nonpolar organic solvents. The protective layers may allow nonpolar organic solvents, such as toluene and/or cyclohexane, that are particularly efficient at recovering waste heat to be used in the ORC systems without degrading components of the integrated power modules.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A waste heat recovery system comprising:
a first organic Rankine cycle system comprising:
  a first heat exchanger configured to transfer heat from a heat source to a first working fluid to vaporize the first working fluid; and
  a first integrated power module configured to expand the first working fluid to generate electricity;
a second organic Rankine cycle system comprising:
  a second heat exchanger configured to transfer heat from the first working fluid to a second working fluid to vaporize the second working fluid; and
  a second integrated power module configured to expand the second working fluid to generate electricity; and
a third organic Rankine cycle system comprising:
  a third heat exchanger configured to transfer heat from the second working fluid to a third working fluid to vaporize the third working fluid; and
  a third integrated power module comprising a turbine and a generator, wherein the turbine is configured to expand the third working fluid to generate electricity, and wherein the third integrated power module is configured to direct the third working fluid through the generator after expanding the third working fluid in the turbine.

2. The waste heat recovery system of claim 1, wherein the third working fluid comprises toluene or cyclohexane.

3. The waste heat recovery system of claim 1, wherein the third working fluid comprises cyclohexane or a nonpolar, organic solvent with a lower solubility than cyclohexane, wherein the solubility is quantified by a Hildebrand solubility parameter.

4. The waste heat recovery system of claim 1, wherein the third organic Rankine cycle system is configured to direct the third working fluid to the third integrated power module at a temperature greater than or equal to 150° C.

5. The waste heat recovery system of claim 1, comprising a fourth organic Rankine cycle system comprising:
a fourth heat exchanger configured to transfer heat from the third working fluid to a fourth working fluid to vaporize the fourth working fluid; and
a fourth integrated power module configured to expand the fourth working fluid to generate electricity.

6. The waste heat recovery system of claim 5, comprising a fifth organic Rankine cycle system comprising:
a fifth heat exchanger configured to transfer heat from the fourth working fluid to a fifth working fluid to vaporize the fifth working fluid; and
a fifth integrated power module configured to expand the fifth working fluid to generate electricity.

7. The waste heat recovery system of claim 1, wherein the third organic Rankine cycle system comprises a condenser configured to cool a portion of the third working fluid downstream of the third integrated power module and upstream of a heat exchanger configured to transfer heat from the third working fluid to a fourth working fluid circulating within a fourth organic Rankine cycle system.

8. The waste heat recovery system of claim 1, comprising an engine configured to generate exhaust gas, wherein the first heat exchanger comprises a boiler configured to transfer heat from the exhaust gas to the first working fluid.

9. A waste heat recovery system comprising:
a first organic Rankine cycle system comprising:
  a first heat exchanger configured to transfer heat from a heat source to a first working fluid to vaporize the first working fluid; and
  a first integrated power module configured to expand the first working fluid to generate electricity;
a second organic Rankine cycle system comprising:
  a second heat exchanger configured to transfer heat from the first working fluid to a second working fluid to vaporize the second working fluid; and
  a second integrated power module configured to expand the second working fluid to generate electricity; and
a third organic Rankine cycle system comprising:
  a third heat exchanger configured to transfer heat from the second working fluid to cyclohexane to vaporize the cyclohexane; and
  a third integrated power module comprising a turbine and a permanent magnet generator, wherein the turbine is configured to expand the cyclohexane to drive the permanent magnet generator to generate electricity, and wherein the permanent magnet generator comprises a protective layer between a stator and a rotor.

10. The waste heat recovery system of claim 9, wherein the second working fluid comprises toluene.

11. The waste heat recovery system of claim 9, wherein the turbine and the permanent magnet generator are disposed within a single, unitary housing.

12. The waste heat recovery system of claim 9, wherein the third integrated power module is configured to direct the cyclohexane between the stator and the rotor.

13. The waste heat recovery system of claim 12, wherein the protective layer disposed between the stator and the rotor is configured to inhibit contact of the cyclohexane with electrical windings of the stator.

14. The waste heat recovery system of claim 13, wherein the protective layer comprises polytetrafluoroethylene.

15. The waste heat recovery system of claim 13, wherein the protective layer comprises a sleeve structure disposed within the permanent magnet generator to encircle the rotor.

16. A method, comprising:
circulating a first working fluid through a first organic Rankine cycle to heat and expand the first working fluid to generate electricity within a first integrated power module;
circulating a second working fluid through a second organic Rankine cycle to transfer heat from the first working fluid to the second working fluid and to expand the second working fluid to generate electricity within a second integrated power module; and
circulating a third working fluid through a third organic Rankine cycle to transfer heat from the second working fluid to the third working fluid and to expand the third working fluid to generate electricity within a third integrated power module, wherein circulating the third working fluid comprises flowing the third working fluid through a generator after expanding the third working fluid through a turbine of the third integrated power module.

17. The method of claim 16, wherein circulating the first working fluid comprises heating the first working fluid with exhaust gas to a temperature equal to or greater than approximately 400° C., wherein circulating the second working fluid comprises heating the second working fluid with the first working fluid to a temperature equal to or greater than approximately 300° C., and wherein circulating the third working fluid comprises heating the third working fluid with the second working fluid to a temperature equal to or greater than approximately 200° C.

18. The method of claim 16, wherein circulating the third working fluid comprises directing the third working fluid to the third integrated power module at a temperature greater than or equal to approximately 180° C.

19. The method of claim 16, wherein circulating the third working fluid comprises directing the third working fluid between a stator and a rotor of the generator in the third integrated power module.

20. The method of claim 16, wherein the third working fluid comprises cyclohexane.

* * * * *